United States Patent Office 3,385,194
Patented May 28, 1968

3,385,194
CONDUIT VENTILATOR
John Gibson, Jr., King of Prussia, Pa., assignor to Anaconda Wire and Cable Company, a corporation of Delaware
Filed Aug. 24, 1966, Ser. No. 574,824
5 Claims. (Cl. 98—1)

ABSTRACT OF THE DISCLOSURE

A ventilator for an electrical conduit, that will permit air circulation but exclude rain and vermin, comprises a lower circular fitting to attach to the end of the conduit, an upper fitting for a junction box, and a larger diameter protective tubular member connected between the two fittings. The space between the fittings is closed with a vermin screen and a rain hood, fixed to the upper fitting, extends over the protective member.

My invention relates to electrical conduits and particularly to means for ventilating risers in such conduits.

The ampacities of electrical conductors are very significantly dependent on the heat transfer from the surface of such conductors, and air circulation at the conductor surface can greatly affect the heat transfer. For adequate mechanical protection of electrical conductors and to protect them from corrosive atmospheric elements, building codes require that wires and cables be enclosed in conduits. This, of course, reduces the heat transfer from the conductors that is due to convection. When there are vertical risers in the conduit the hot air accumulates at the top, producing a hot spot which may ultimately cause cable failure. It is not generally possible to leave the tops of conduits open since this would defeat the very purpose of their use. Particularly, outdoors, there has not, prior to my present invention, been any effective means for properly ventilating a conduit while still protecting the cable from the elements, vermin, and mechanical abuse.

I have invented a conduit ventilator which completely solves the problems hereinabove related and others, as will be explained. My conduit ventilator comprises upper and lower tubular members and means rigidly connecting them in spaced-apart relationship, with an air passage between them. A central tubular member which incloses a greater sectional area than either the upper or lower members surrounds this passage, and my ventilator also comprises a sloping hood extending from the upper member over and beyond the central member. A screen within the central member connects the upper and lower members and completely covers the air passage.

In one preferred embodiment of my invention the central member is supported by a plurality of radially extending vertical plates suspended from the hood. Advantageously my ventilator will comprise internal threads in the lower member for attachment to an electrical conduit and a threaded length to the upper member for attachment to an electrical fitting such as a pothead, junction box, or an additional conduit.

For installation on an existing cable and conduit without severing the cable the elements of my ventilator may be split.

A more thorough understanding of my invention may be gained from a study of the appended drawing.

Figure 1:
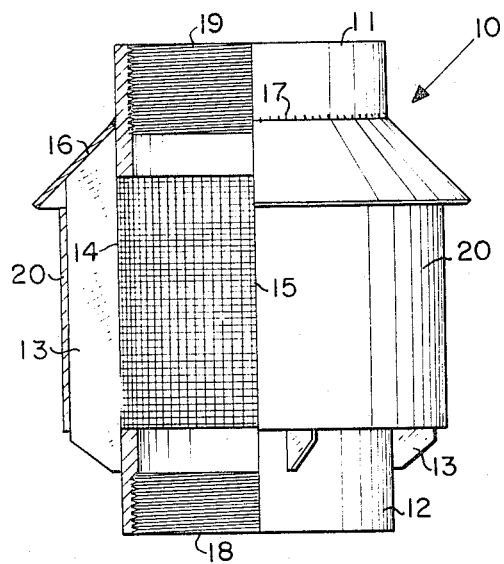
FIGURE 1 is an elevation, partly in section, of the ventilator of my invention.

Referring to the figures my ventilator, indicated generally by the numeral 10, has a short upper tubular member or pipe length 11 and a similar lower pipe length 12 held in spaced-apart relation by a plurality of radially extending welded plates 13—13. A gap 14 provides an air passage between the members 11, 12 that is covered by a screen 15 having a mesh small enough to exclude vermin but large enough to allow free passage of air. Where termites and ants present a problem, or it is necessary to prevent bees from nesting, a fine fly-screen is suitable for the screen 15 which is conveniently in the form of a cylinder having the same diameter as the O.D. of the pipes 11 and 12. A frustoconical hood 16 is welded to the pipe 11 at a circumferential line 17 and also to the plates 13. The hood 16 extends beyond a central tubular member 20 which surrounds the plates 13 and is welded to them for support. The tubular member 20 and hood 16 completely protect the screen 15 from mechanical damage and the whole structure is extremely rugged and eminently capable of protecting the cable within a conduit.

For connecting to a metal conduit the pipe member 12 has been internally threaded at the surface 18 and the member 11 has been similarly threaded at the surface 19. It will be understood that the pipes and particularly the upper pipe length 11 may be externally threaded to fit directly into a pothead, junction box or other appliance or that, for use with nonmetallic conduits, the ventilator 10 may be smooth surfaced instead of threaded and affixed with cement or binding straps.

Figure 2:
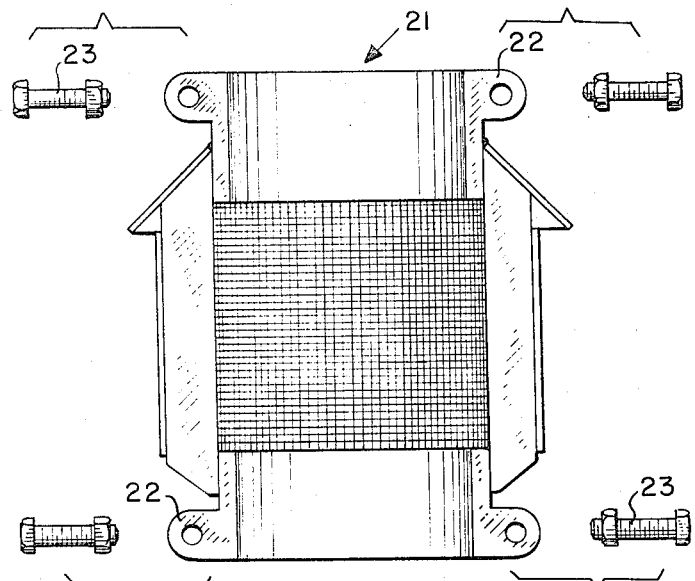
FIGURE 2 is an elevation of an embodiment of my invention.

In FIGURE 2 I have shown a split unit 21 two of which can be combined by means of the lugs 22—22 and bolts 23—23 to form a ventilator around a conduit into which cable has already been installed. This split ventilator can, of course, be installed without cutting the cable.

In the application of my invention at the time a cable is being installed it is merely necessary to cut the vertical riser of a conduit shorter than would otherwise be done to allow for the height of the ventilator 10. It is usually most convenient to thread the ventilator onto the cut conduit length by means of the threads 18 before the conduit is fixed into position. But if there is sufficient room, and particularly if the ventilator is to be cemented to the conduit rather than threaded on, the ventilator may be attached after the conduit riser is fully installed. The cable is then pulled through both the riser and the ventilator in the usual manner since my ventilator provides a through passage.

When the embodiment of FIGURE 2 is to be applied the required length of conduit is cut from the top of a riser without cutting the cable, and leaving a stub length of riser suspended downwardly. The top of the cut riser and the stub are coated with cement or other sealant, the two halves of the split unit are positioned around the top of the cut riser and the stub and the bolts 23 are inserted and tightened.

I have invented a new and useful article of manufacture for which I desire an award of Letters Patent.

I claim:
1. A vertical conduit ventilator comprising
 (A) an upper tubular member,
 (B) a lower tubular member,
 (C) means rigidly connecting said members in spaced-apart relationship thereby providing an air passage between said members,
 (D) a central tubular member surrounding said passage, said central member inclosing a greater sectional area than either said upper or said lower members,
 (E) a sloping hood extending from said upper member over and radially beyond said central member, and
 (F) a screen within said central member connecting said upper and lower members and completely covering said air passage.

2. The conduit ventilator of claim 1 comprising a plurality of radially extending vertical plates connecting said upper and lower members and supporting said central member.

3. The conduit ventilator of claim 1 wherein said lower member comprises internal threads for attachment to an electrical conduit.

4. The conduit ventilator of claim 1 wherein said upper member comprises a threaded length for attachment to an electrical fitting.

5. The ventilator of claim 1 elements of which are split whereby it can be installed over an existing cable and conduit without severing said cable.

References Cited

UNITED STATES PATENTS 3,319,202   5/1967   Lockie _____ 174—37

FOREIGN PATENTS 322,307   11/1934   Italy.

LLOYD L. KING, *Primary Examiner.*